Patented Aug. 2, 1932

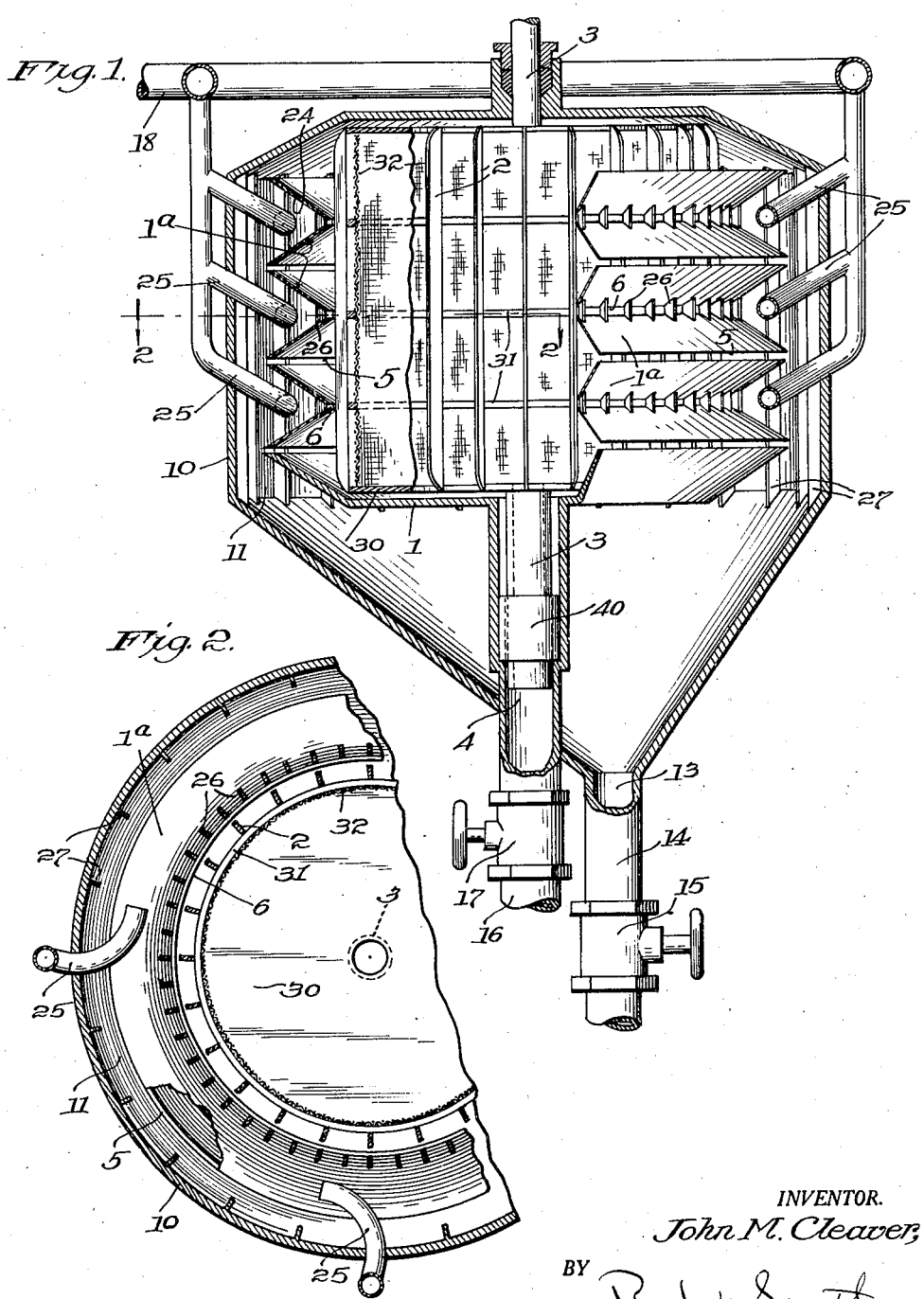

1,869,797

UNITED STATES PATENT OFFICE

JOHN M. CLEAVER, OF LOS ANGELES, CALIFORNIA

SEPARATION OF MATERIALS

Application filed April 20, 1931. Serial No. 531,327.

This invention relates to separation of materials, such as removal of solids from liquids or removal of finely divided liquids or solids from gases, and has for its object to provide a continuous separation which will be free of obstruction by accumulated materials, and which may be carried on with minimum expenditure of energy and by an extremely simple but practical apparatus offering no difficulties of mechanical construction or operation.

More particularly it is an object of the invention to separate suspended material from a fluid, by exerting sufficient pressure on the fluid to force it centripetally against the action of centrifugal force, which, since suspended material is not subject to motivation by pressure, will centrifugally separate the suspended material from the centripetally flowing fluid.

It is a further object of the invention to create the desired centrifugal force by rotating the body of fluid which is being forced centripetally by a pressure in excess of the pressure occasioned by the centrifugal force, and to utilize this whirling body of fluid for changing the direction of movement of at least some of the particles of suspended materials mixed with the fluid supply, so that while the incoming fluid, due to its pressure motivation, will mix with and be incorporated in the whirling body of fluid, at least some of the particles of suspended materials upon striking the whirling body of fluid, will be thrown off at a tangent without entirely entering the whirling mass, and consequently at least some of the suspended materials will be separated by this repelling action caused by the momentum of the fluid and irrespective of centrifugal force, while any remaining suspended materials which entirely enter the whirling body of fluid will be separated by the centrifugal force opposed to the centripetally flowing fluid.

The invention thus contemplates separation by centrifugal movement of suspended materials and centripetal flow of the fluid with which the suspended materials are mixed; together with some separation of suspended materials not by centrifugal force, per se, but as a result of at least some of the suspended materials being thrown off at a tangent when first contacting a body of fluid whirling under pressure and having a momentum in excess of the incoming fluid supply.

It is a still further object of the invention to provide an apparatus adapted for the desired centripetal flow of fluid while centrifugally separating suspended materials which may be mixed with the fluid; and to also adapt the apparatus for supplying the mixed suspended materials and fluid, so that the incoming flow strikes a whirling mass of fluid under pressure and having a greater momentum than that of the incoming flow, in order to throw off and separate at least some of the particles of suspended material without ever entering the whirling mass in which the centrifugal separation of any remaining suspended materials takes place.

It is a still further object of the invention to adapt the apparatus for readily controlled withdrawal of the separated suspended materials, and to rotate the body of fluid by a suitable impeller, with the incoming flow supplied to the apparatus adjacent its outer periphery, and the fluid from which suspended materials have been separated discharging adjacent the axis of the apparatus so that the impeller may be rotated with minimum consumption of power.

It is a still further object of the invention to preferably discharge the fluid from which suspended materials have been separated, through a suitable filtering medium which is adapted to separate any such extremely fine particles of suspended materials, the individual mass of which is too small to bring them under the discarding influence of the centrifugal stress resulting from rotation of the impeller, and which will thus collect on the filtering medium which is preferably arranged for rotation with the impeller, so that the accumulation of residue will periodically aggregate such a mass as will be influenced by centrifugal stress for removal from the filtering medium and discharge through the centripetally flowing fluid before such fouling of the filtering surface as would impair the continuous operation of the apparatus.

The invention will be readily understood from the following description of the accompanying drawing which shows in somewhat diagrammatic form a preferred apparatus for performing the desired separation, and in which:

Fig. 1 is an axial section through the apparatus.

Fig. 2 is a cross section on the line 2—2 of Fig. 1.

The invention is adapted for separation of any finely suspended matter from a fluid, either solid materials from a liquid or finely divided liquids or solids from gases, and embodies centrifugal separation of suspended materials from a whirling mass of centripetally flowing fluid, together with forcing aside of at least some of the suspended material as the incoming flow first contacts the whirling mass of fluid, so that while the fluid element of the incoming flow is incorporated in the whirling mass, more or less of the suspended material is thrown off at a tangent and separated without ever having been incorporated entirely in the whirling fluid.

This desired separation may be obtained by use of a device comprising a housing 1 in which a mass of fluid may be rotated by impellers 2 mounted on a drive shaft 3 which is rotated in suitable manner, with fluid containing finely suspended matter supplied to the housing adjacent its periphery and at a pressure adapted to force the fluid element of the flow centripetally through the housing to an outlet 4 adjacent its axis, and the suspended matter acted upon by the whirling mass in the housing for centrifugal discharge at the periphery of the housing. At the same time the momentum of the whirling mass of fluid in the housing, will tangentially throw off at least some of the suspended matter in the incoming flow when it first contacts the whirling fluid which is under pressure incident to its motion, so that such suspended matter is separated irrespective of the subsequent separation due to centrifugal force as opposed to centripetal flow of fluid; and the intake for the incoming flow is arranged so as to permit suspended matter being thus readily thrown off upon striking the whirling mass in housing 1.

As an instance of one practical embodiment the housing 1 may have its axial discharge 4 depending from its underside, with shaft 3 projecting axially into the housing through its upper wall and the impeller blades 2 radially mounted on the shaft. Cross-sectionally the peripheral wall of the housing may comprise a plurality of superimposed V-shaped sections 1a, so that the peripheral space within the housing convergently tapers radially outwardly to the apices of the superimposed V-shaped sections.

At the respective apices of sections 1a the wall of the housing is circumferentially slotted so as to form outlets 5 for the centrifugally separated suspended materials; and the intake for the flow containing finely suspended matter preferably comprises a plurality of annular slots 6 in the peripheral wall of the housing at the junctions of the bases of its superimposed V-shaped sections, so that outlets 5 are spaced appreciably radially outwardly beyond the intakes 6.

In operation, with impellers 2 rotated at a suitable speed, fluid containing suspended matter is supplied to intakes 6 at a pressure greater than the pressure in housing 1 at said intakes resulting from the centrifugal force created by the rotating impellers, but at a pressure less than the pressure occasioned by the centrifugal force at the outlets 5 which are radially outwardly beyond intakes 6; and the fluid is thus forced into housing 1 where it is rotated by the impellers so that suspended matter is centrifugally forced radially outwardly for discharge through slots 5, while the fluid, free of such suspended matter, and responsive to the pressure of the fluid supply, spirals centripetally in the housing for ultimate discharge at outlet 4.

The whirling fluid in housing 1 is thus under pressure and has a momentum greater than that of the incoming flow, and consequently when the incoming flow first strikes the whirling fluid at intakes 6, at least some of the suspended matter, upon impact with the whirling mass will be thrown off at a tangent through slots 6 for separation from the inflowing fluid, which, due to its pressure, will be incorporated in the whirling mass for subsequent centrifugal separation of any remaining suspended matter.

A shell 10 which encloses housing 1 preferably provides for flow supply to the intakes 6 and removal of separated suspended matter from the outlets 5, and may form a circumferential distributing chamber 11 radially outwardly beyond housing 1; and below said housing the shell is preferably funnel-shaped and terminates at its lower end in an outlet 13.

The outlet 13 may communicate with a pipe 14 and is preferably provided with a suitable valvular control 15 for regulating withdrawal of the separated suspended matter; and the outlet 4 for the fluid which has been freed of suspended matter preferably communicates with a pipe 16 which may be provided with a suitable valvular control 17. A pipe 18 may supply the flow to chamber 11, the flow being under a pressure which need be just in excess of the pressure occasioned by centrifugal force at intakes 6.

By enclosing the housing 1 in the shell 10 and regulating the valve 15, the pressure in the shell exteriorly of outlets 5 may be built up so that only suspended material and practically none of the fluid escapes at said outlets; and the provision of valve 15 on a non-rotating part of the apparatus eliminates mechanical difficulties in regulating the valve. In similar manner the valve 17 being mounted in the non-rotating pipe 16 avoids difficulties of mechanical construction or operation, and by suitable regulation controls the flow through the apparatus, with practically no more power consumed when the device is operating than when it is running idle, due to the fact that the whirling mass of fluid in housing 1 is reduced to practically a state of axial flow before released from the housing at the outlet 4.

The provisions of a plurality of restricted and circumferentially extending intake slots 6, having however a comparatively large combined cross-sectional area, insures a relatively slow momentum of approach, and means are preferably provided for uniformly distributing the incoming flow to the intakes 6 and spacing said incoming flow from the suspended matter which is discharged through slots 5.

As an instance of this arrangement a plurality of conduits 25 preferably branch from pipe 18 and open at arcuately spaced points and in the same circumferential direction into chamber 11 at the respective superimposed recesses 24 which are formed exteriorly of the peripheral wall of housing 1 by its V-shaped sections 1a, and vertically disposed radial baffles 26 may be circumferentially spaced in recesses 24 so as to extend across the intake slots 6.

It will thus be seen that the incoming flow is circumferentially discharged into chamber 11 via of conduits 25 with baffles 26 stopping rotary motion of the flow as it enters intakes 6; and the suspended materials are discharged through slots 5 radially outwardly beyond the incoming flow through conduits 25, with baffles 27 at the inner surface of shell 10 preferably stopping rotary movement of the discharged materials so that they may be readily collected in the funnel-shaped lower portion of the shell.

The invention thus provides for efficient separation of suspended matter from fluid, by centrifugally discharging the suspended matter in opposition to centripetal flow of the fluid, together with initial separation of at least some of the suspended matter irrespective of centrifugal force and merely as a result of the momentum of the whirling fluid which is under pressure throwing off some of the suspended matter in the incoming flow immediately upon contact of the approaching flow with the whirling mass; and the invention further provides extremely simple but practical mechanism for producing the desired separation, with the whirling mass of fluid reduced to practically a state of axial flow before its discharge, thereby avoiding excessive power consumption, and the moving elements housed completely within stationary parts, which are provided with the necessary valvular means for regulating the discharge of both the fluid and the separated suspended matter, so that difficulties of mechanical construction or operation are avoided.

It will be noted that the incoming flow is rotated in chamber 11 as a result of the conduits 25 all opening in the same circumferential direction, with the spacing of outlets 5 radially outwardly beyond the open ends of the conduits preventing contamination of the incoming flow by the residue discharged through said outlets; and the resulting centrifugal stress in chamber 11 thus tends to separate the coarser extraneous materials so that they collect against baffles 27 at the inner surface of shell 10 for discharge into the lower portion of the shell, while the remainder of the flow is stopped in its rotary movement by baffles 26 and is thus directed radially inwardly through inlets 6 where it strikes the fluid in the housing which is being rotated by impellers 2. Rotational inertia of the radially moving flow thus tends to prevent at least some of the suspended materials from entering the whirling mass as a result of such residue being thrust aside from the direct line of flow so that it never completely enters the housing 1; while the remaining flow which enters the housing is incorporated in the fluid rotated by the impellers, and is thus subjected to centrifugal stress whereby solid materials are discharged through outlets 5. At the same time the fluid which has been freed of all or nearly all the suspended materials, flows centripetally through housing 1 under the influence of the initial pressure of the flow, for discharge at outlet 4.

If there still remains some extremely fine particles of suspended materials mixed with the fluid, the flow may be passed through a filtering medium before discharge at outlet 4, with the filtering medium preferably adapted to automatically clean itself of any such accumulation of residue as might impair the continuous operation of the device.

For this purpose the impellers 2 may be vertical blades projecting radially from a hollow cylindrical drum 30 which has closed ends and the peripheral wall of which comprises merely a skeleton framing as shown at 31. Shaft 3 projects beyond the respective ends of the drum for rotating the drum with the shaft, and the depending portion of the shaft is hollow and communicates with the interior of the hollow drum, and at its lower end opens into outlet 4 beyond a suitable stuffing box 40. A filtering medium shown as filter cloth 32 overlies the inner surface of the peripheral wall of the skeleton drum, so that all of the fluid flowing toward outlet 4 strikes the filtering medium for separation of even the finest particles of suspended materials and discharge via of the hollow shaft of only the clean fluid.

The particles which collect on the filtering medium and which are so fine that individually they are not removed by centrifugal stress, will thus accumulate until their aggregate is of such mass that the centrifugal stress in housing 1 will discharge the same through outlets 5 as previously described, thereby automatically periodically clearing the filtering medium of residue before such fouling as might impair the flow of fluid and thus insuring continuous operation, which as previously described may include initial centrifugal separation of coarser suspended materials, followed by thrusting aside of suspended materials due to rotational inertia of the radially directed flow against a circumferentially moving fluid, together with centrifugal separation of those suspended materials which enter the whirling flow, and final filtration and automatic removal from the filtering medium of any extremely fine particles of suspended matter.

I claim:—

1. The method of removing materials which are finely suspended in a fluid, which comprises supplying the fluid containing the suspended materials to a body of said fluid which is under pressure and flowing at an angle to and with a momentum appreciably greater than that of the fluid supply, so as to throw off from the flowing body of fluid at least a part of the suspended materials while incorporating the remainder of the fluid supply in said flowing body of fluid, and collecting and removing said thrown-off suspended material without the same having been incorporated in the flowing body of fluid.

2. The method of removing materials which are finely suspended in a fluid, which comprises supplying the fluid containing the suspended materials to a body of said fluid rotating under pressure at a momentum appreciably greater than that of the fluid supply, the fluid supply being substantially radially to and adjacent the periphery of the rotating body of fluid so as to throw off from said body fluid at least a part of the suspended materials, while incorporating the remainder of the fluid supply in said rotating fluid, collecting and removing said thrown-off suspended material without the same having been incorporated in the rotating fluid, and centrifugally discharging from the rotating fluid the remainder of the suspended materials, the pressure of the fluid supply being such as to cause centripetal flow to an axial discharge, of the fluid from which the suspended materials have been separated.

3. In combination, a housing, an impeller adapted for rotation in the housing, a discharge from the housing radially outwardly beyond the impeller, an intake to the housing spaced radially inwardly from the discharge, an outlet at the axis of the housing, a shell enclosing the housing and forming a passageway communicating with the intake and the discharge, a supply conduit leading to said passageway, and a conduit communicating with the axial outlet and extending outwardly through the shell.

4. In combination, a housing, an impeller adapter for rotation in the housing, a discharge from the housing, an intake to the housing, an outlet at the axis of the housing, a shell enclosing the housing, a supply conduit communicating with the intake, a discharge conduit communicating with the discharge, a conduit communicating with the axial outlet and extending outwardly through the shell, a valvular control for the discharge conduit, and a valvular control for the conduit which communicates with the axial outlet.

5. In combination, a housing, an impeller adapted for rotation in the housing, a discharge at the periphery of the housing, an intake to the housing, an outlet at the axis of the housing, a shell enclosing the housing and forming a passageway communicating with the intake and the discharge, a supply conduit leading to said passageway, a discharge conduit communicating with said passageway, and a conduit communicating with the axial outlet and extending outwardly through the shell.

6. In combination, a housing, an impeller adapted for rotation in the housing, a circumferential discharge slot in the housing, an intake to the housing, an outlet at the axis of the housing, a shell enclosing the housing and forming a passageway communicating with the intake and the discharge, and a supply conduit leading to said passageway.

7. In combination, a housing, an impeller adapted for rotation in the housing, a discharge from the housing, a circumferential intake slot in the housing spaced radially inwardly from the discharge, an outlet at the axis of the housing, a shell enclosing the housing and forming a passageway communicating with the intake and the discharge, and a supply conduit leading to said passageway.

8. In combination, a housing, an impeller adapted for rotation in the housing, a discharge from the housing, a circumferential intake slot in the housing, circumferentially spaced baffles extending across the intake slot at the outer surface of the housing, an outlet at the axis of the housing, a shell enclosing the housing and forming a passageway communicating with the intake slot, and a supply conduit leading to the passageway.

9. In combination, a housing, an impeller adapted for rotation in the housing, a discharge at the periphery of the housing, an intake to the housing, an outlet at the axis of the housing, a shell enclosing the housing and forming a passageway communicating with the intake and the discharge, a supply conduit leading to said passageway, and circumferentially spaced baffles in said passageway radially outwardly beyond the housing.

10. In combination, a housing having an outer peripheral wall comprising a plurality of superimposed V-shaped sections, an impeller in the housing, discharges at the apices of said V-shaped sections, intakes at the junctions of the bases of said V-shaped sections, an outlet at the axis of the housing, a shell enclosing the housing, and a supply conduit leading to said intakes.

11. In combination, a housing having an outer peripheral wall comprising a plurality of superimposed V-shaped sections, an impeller in the housing, discharges at the apices of said V-shaped sections, annular intake slots at the junctions of the bases of said V-shaped sections, circumferentially spaced vertical baffles extending across the intake slots at the outer surface of the housing, an outlet at the axis of the housing, a shell enclosing the housing and forming a passageway communicating with the intake slots, and a supply conduit leading to said passageway.

12. In combination, a housing having an outer peripheral wall comprising a plurality of superimposed V-shaped sections, an impeller in the housing, discharges at the apices of said V-shaped sections, intakes at the junctions of the bases of said V-shaped sections, a shell forming a passageway surrounding the peripheral wall of the housing, supply pipes opening into said passageway adjacent the junctions of the bases of the V-shaped sections and in radially inwardly spaced relation from the apices of said V-shaped sections, and an outlet at the axis of the housing.

13. In combination, a housing, an impeller adapted for rotation in the housing, a discharge from the housing, an intake to the housing spaced radially inwardly from the discharge, a shell forming a passageway surrounding the housing, a supply pipe opening into said passageway in radially inwardly spaced relation from the discharge, and an outlet at the axis of the housing.

14. In combination, a housing, an impeller adapted for rotation in the housing, a discharge from the housing, an intake to the housing, an outlet at the axis of the housing, a shell enclosing the housing and forming a passageway communicating with the intake and the discharge, and a supply conduit leading to said passageway.

15. In combination, a housing, an impeller adapted for rotation in the housing, a discharge from the housing, an intake to the housing, an outlet at the axis of the housing, a shell enclosing the housing and forming a passageway communicating with the discharge, circumferentially spaced baffles in said passageway radially outwardly beyond the housing, and a supply conduit leading to the intake.

In testimony whereof I have affixed my signature.

JOHN M. CLEAVER.